Figure 1:
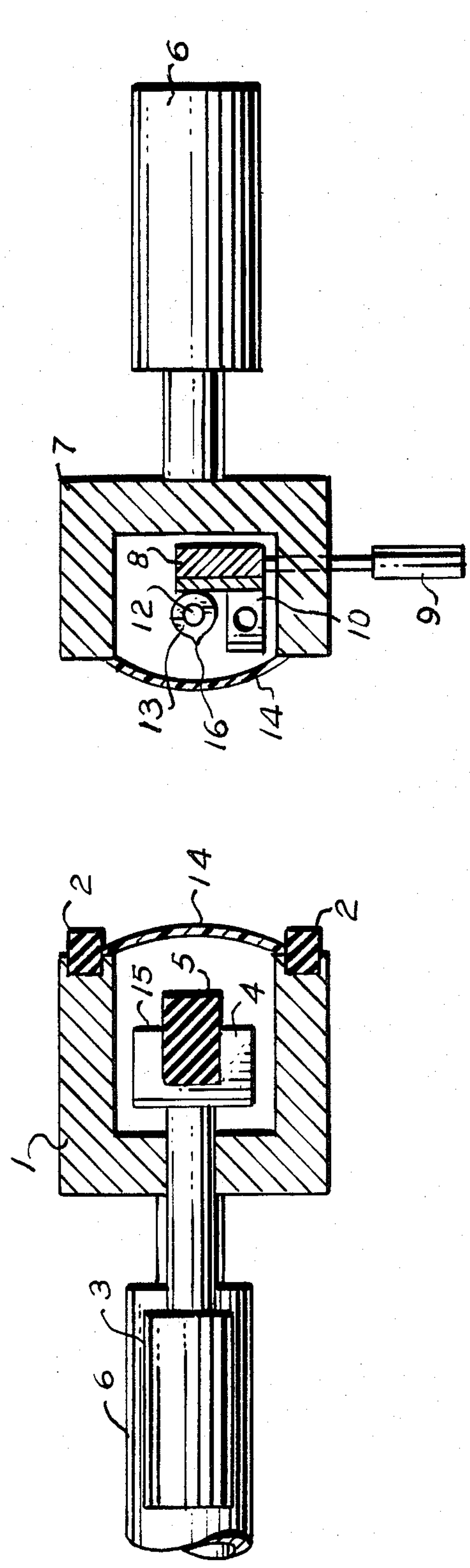
Figure 3:
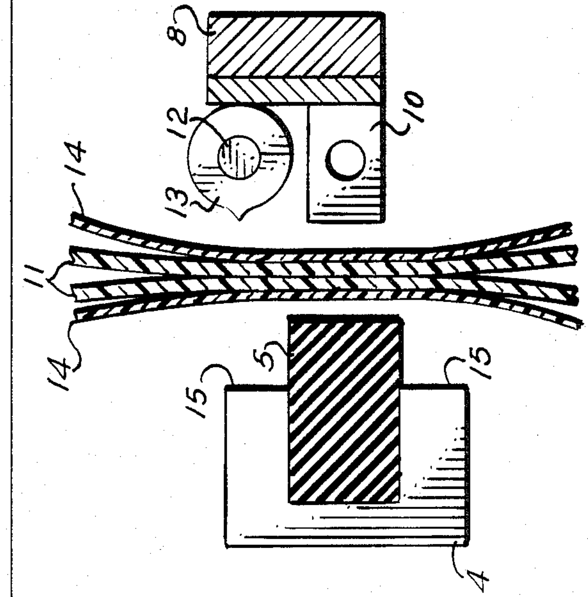
Figure 2:
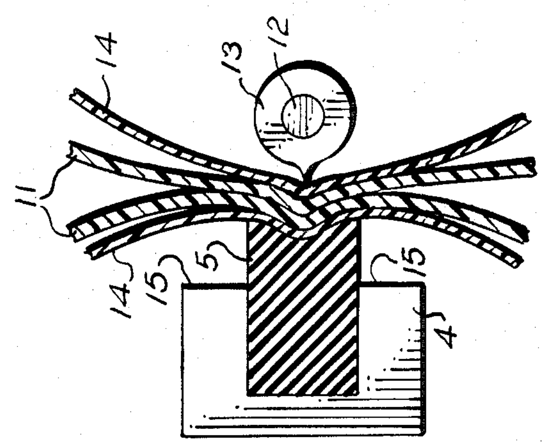

United States Patent [19]

Hsu

[11] Patent Number: 4,529,472

[45] Date of Patent: Jul. 16, 1985

[54] IMPULSE SEALING APPARATUS

[75] Inventor: Wei K. Hsu, Box 366, 159 2nd St., Jersey City, N.J. 07302

[73] Assignee: Wei K. Hsu, Jersey City, N.J.

[21] Appl. No.: 440,577

[22] Filed: Nov. 10, 1982

[51] Int. Cl.³ .............................................. B32B 31/20

[52] U.S. Cl. .................................... 156/498; 156/515; 156/583.2; 156/583.3

[58] Field of Search .................. 156/498, 583.2, 380.4, 156/380.6, 251, 515, 583.3, 380.7, 312; 53/479

[56] References Cited

U.S. PATENT DOCUMENTS

| | | | |
|---|---|---|---|
| 2,621,704 | 12/1952 | Langer | 156/498 |
| 2,796,914 | 6/1957 | Park | 156/498 |
| 2,961,031 | 11/1960 | Fener | 156/515 X |
| 3,332,204 | 7/1967 | Frank | 53/180 |
| 3,384,528 | 3/1968 | Lehmacher | 156/515 |
| 3,593,000 | 7/1971 | Forma | 219/243 |
| 3,692,608 | 9/1972 | Risgaard | 156/282 |
| 3,692,613 | 9/1972 | Pederson | 156/498 |
| 3,703,427 | 11/1972 | Sellers et al. | 156/583.2 X |
| 3,982,991 | 9/1976 | Hamm | 156/515 |
| 4,075,818 | 2/1978 | Wright et al. | 156/498 X |
| 4,113,182 | 9/1978 | Wildmoser | 156/515 |

*Primary Examiner*—Robert A. Dawson
*Attorney, Agent, or Firm*—Auslander & Thomas

[57] ABSTRACT

This invention relates to an improved method and apparatus for impulse sealing thermoplastic materials in automatic form fill seal machines with separate applications of sealing, cutting and cooling.

6 Claims, 4 Drawing Figures

1 2 6 3 15 5 14 4 2

7 13 12 8 6 16 14 10 9

IMPULSE SEALING APPARATUS

This invention relates to apparatus for sealing, permanently adhering two or more sheets of thermoplastic materials. The sealing apparatus simultaneously cuts through at least two layers of thermoplastic materials or film. This invention is specially related to applications in automatic form and fill sealing machines in packaging.

Automatic form and fill sealing machines utilising thermoplastic materials are widely used, but basically the sealing method has been same for many years, see Langer, U.S. Pat. No. 2,621,704; Park, U.S. Pat. No. 2,796,914; Fener, U.S. Pat. No. 2,961,031; and Wright et al., U.S. Pat. No. 4,075,818; Sellers et al., U.S. Pat. No. 3,703,427, Perderson, U.S. Pat. No. 3,692,613 etc. However, the technology is still plagued by a proneness toward a high rate of seal imperfections due to sensitivity of sealing temperature, complexity of electronic controls, breakage of impulse sealing ribbons and wires, overheating of edges of bags, manual adjustments etc. These problems particularly affect the transverse seals (end seals of pillow bags). The reason for this is that as soon as the package is formed by the seals, product weight impacts. If the seals are inadequate, leaks will result.

Accordingly it is the objective of this invention to provide an an improved sealing system for thermoplastic films. It is a further objective of this invention to provide an apparatus wherein the design of the same is practical, efficient, simple, and more reliable than any commercially available im pulse systems for automatic form and fill sealing machines.

On automatic form and fill sealing packaging machines, a web of thermoplastic film is unwound from a roll, then formed into a tube by means of a folder, forming a continuous tube. A seal in the machine direction (vertical heat sealing) seals the edges of the web forming the tube. A transverse seal is made, simultaneously cutting through the tube-forming thermoplastic film. Before the jaws are opened, a cooling cycle cools the heated cross seal, hardening the cross seal. The jaws are then opened, and a preset length of formed tube is advanced for filling and sealing. Product desired for filling the pouch is discharged into the pouch, and the jaws close making a second sealing cutting and cooling cycle.

The sealing system commonly employed for these machines is the so called "impulse sealing system", in which a heavy electric current flows through the sealing element for only a fraction of a second. As soon as the electrical current is terminated, the cooling cycle begins and remains for the balance of the sealing cycle, until the jaw opens. During the next sealing cycle, as soon as the jaws close the electrical current performing the sealing commences. The pouch-forming sealing and filling repeats. Due to the short electrical pulse to heat the thermoplastic film, and the short time for heat transfer, the temperature of the element is estimated to be somewhere near 500 degrees F. The noncontacting part of the element may reach a temperature as high as 1000 degrees.

Many sizes, shapes and thicknesses of sealing elements have been used but because of the repeated heavy heating and cooling of the element and the uneven heat takeaway from the element, due to the presence of the pouch (up to three thicknesses of thermoplastic films) the life span of the sealing element is limited. The cost of the element is also high for replacement, and down time. The sealing element also is easily damaged by products caught in between the jaws.

Accordingly, the present invention provides a method and apparatus for sealing and continuously cutting through at least two layers of thermoplastic films. The apparatus includes a pair of jaws, and means for closing and opening the jaws. On one of these jaws, a pneumatically operable back-up rubber of desired durometer is mounted. On the opposite jaw, a specially machined and continuously heated jaw is installed on a support, as well as a rectangular cooling bar. Chilled liquid flows through the cooling bar, and a constantly flowing electrical current and a temperature controller maintain the heating element at a low constant temperature, at about 250 degrees F.

An embodiment of the invention is illustrated in the accompanying drawings wherein:

FIG. (1) is an enlarged vertical cross section of the complete sealing jaws.

FIG. (2) is an enlarged vertical cross section of the sealing cycle.

FIG. (3) is an enlarged, partly exploded vertical cross section of the cooling cycle.

FIG. (4) is an exploded cross section of the thermoplastic tube showing the sealing area, and the severing area.

Referring first to FIG. (1) The complete apparatus for forming the transverse seal comprises two movable jaws 1 and 7. Each jaw and its accompanying mechanisms is actuated by its individual pneumatic cylinder 6. When jaws 1 and 7 close they hold the thermoplastic films to be sealed tightly between them.

Rubber strips 2, mounted on the movable jaw 1, on the jaw closing increases the friction and grip on the thermoplastic film 11. An aluminum, rubber support 4, has mounted on it a soft rubber 5. The rubber 5 has a durometer of about 35, measured by a Shore A scale on a durometer manufactured by Shore Instruments of Long Island, New York. The aluminum rubber support 4 and soft rubber backup 5 are movable by actuation of the pneumatic cylinder 3. Within the enclosure of jaw 7 are the heat sealing and cooling mechanisms 13 and 10. Both of these items are mounted on metal support 8. Metal support 8 can be moved in a vertical plane by the pneumatic cylinder 9. The sealing mechanism 13 is constantly heated by electric heating cartridge 12. Temperature of the heating element is maintained constant by an automatic temperature controller as is well known in the art. The cooling bar 10 is chilled and maintained chilled by passage of chilled water through the center hole in the bar. Teflon® cloths 14 drape over the front of both jaws 1 and 7.

Figure 4:
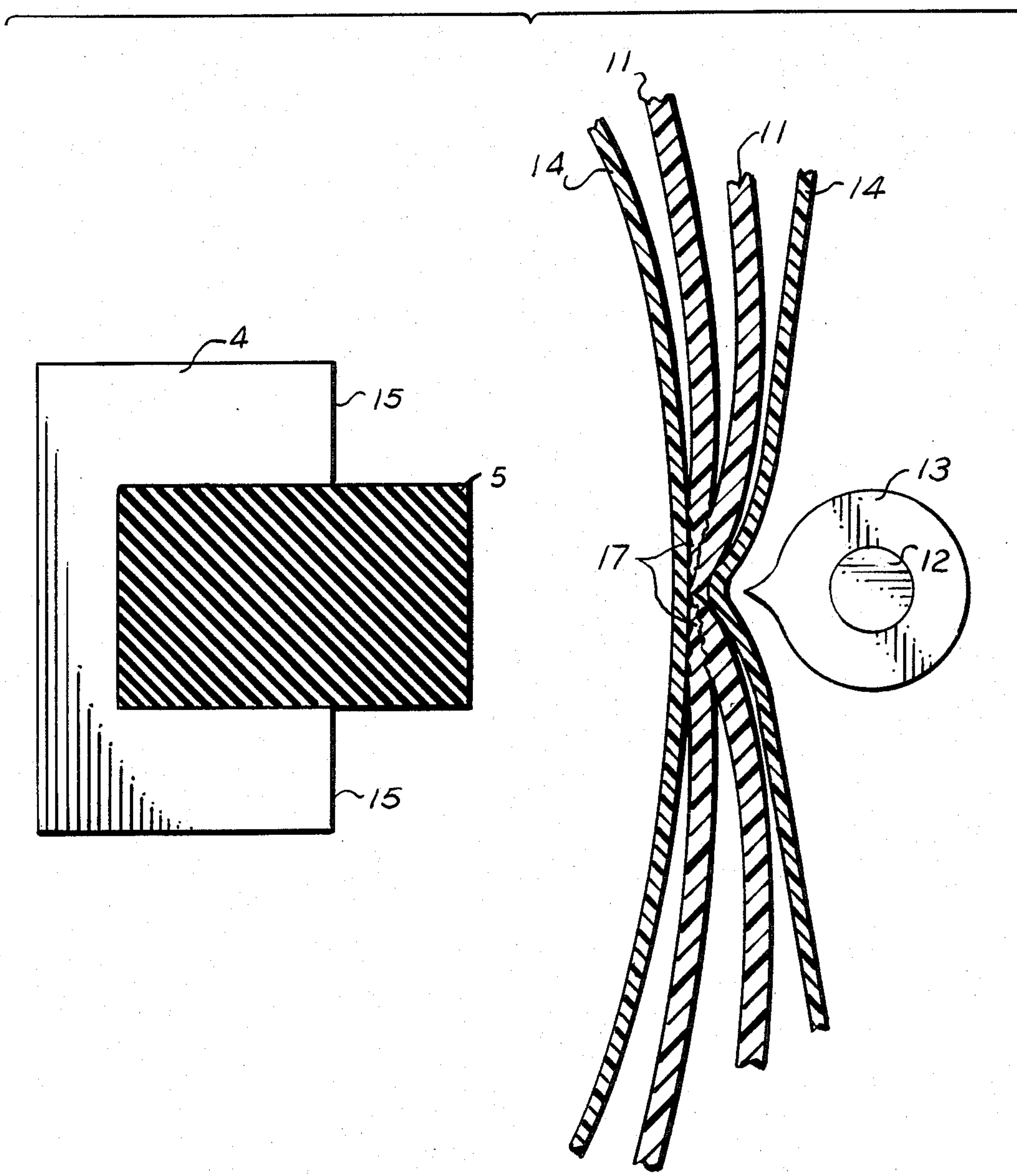

In operation, thermoplastic film 11 to be sealed with a cross seal is mechanically positioned between the jaws 1 and 7. Pneumatic cylinders 6 close jaws 7. The thermoplastic film 11 in tube form is tightly held without slippage between rubber strips 2 and the front of jaw 7. The pneumatic cylinder 3 moves the aluminum rubber support 4 and back-up rubber 5 forward in a horizontal motion so as to press the Teflon® cloths 14 and the thermoplastic film 11 against the heated sealing element 13. At the same time the rubber 5 and the specially machined sealing element 13 directs the thermoplastic film 11 to firmly touch the sealing element 13 at areas 15, and the sharp cutting edge 16. The thermoplastic film 11 may contact areas 15 at position, 17. Due to the heat, area 17 will melt and adhere by the pressure of pneumatic cylinder 3 and rubber 5. After a desired sealing time, adjustable by a timer the pneumatic cylinders 3 retract and relieve pressure on the thermoplastic films 11. However, due to the heat, the melted thermoplastic films 11 will adhere to themselves as well as adhering to the Teflon® cloths 14, which grip them. During this process, the jaws 1 and 7 are still closed. As soon as the aluminum rubber support 4 with the soft backup rubber 5 is retracted the pneumatic cylinder 9 moves the cooling bar 10 to the position previously occupied by sealing bar 13. The pneumatic cylinders 3 again move the back up rubber 5 forward horizontally, and squeezes the sealed thermoplastic tube 11 held between the Teflon® cloths 14 against the cooling bar 10, thus cooling the sealed area 17. Due to the excessive pressure at area 17 as shown in FIG. 4 exerted by the sharp point 16 of sealing element, the thermoplastic film 11 is severed by the heat and pressure much as a knife.

I claim:

1. A system for heat sealing and severing thermoplastic films comprising a pair of elongated horizontal jaws, each said jaw in a "U"-shaped configuration mounted for movement toward and away from each other, each said jaw including a flexible cloth covering its open face, said cloth yieldable and heat resistant, said jaws adapted to hold at least two layers of thermoplastic film therebetween gripped at the two interfaces of the "U" of said jaws, one jaw including a resilient member therein mounted along the length thereof for movement towards and away from the other jaw, the other jaw including a heatable bar having a longitudinally extending projecting sharp edge and a separate longitudinally extending coolable bar mounted therein, both said bars mounted on a common support, said flexible cloth adapted to yield to said sharp projecting edge without being severed, and means for vertically moving said common support for alternately aligning said sharp edge and said coolable bar with said resilient member.

2. The system according to claim 1, wherein the heatable bar and the coolable bar are constantly heated and cooled respectively during operation.

3. The system according to claim 1, wherein the heatable bar and resilient member are configured to effect heat sealing on the sides of the sharp edge while exerting maximum pressure at the edge to enable severing.

4. The system according to claim 3, wherein said coolable bar and said resilient member are configured to cool said seal.

5. The system according to claim 1 wherein said flexible cloths are adapted to releasably receive melted thermoplastic.

6. The system according to claim 1, including resilient gripping means at said jaw interface.

* * * * *